US012152406B2

(12) United States Patent
Odom

(10) Patent No.: US 12,152,406 B2
(45) Date of Patent: Nov. 26, 2024

(54) ADJUSTABLE AND CONFIGURABLE STANDOFF

(71) Applicant: Triangle Brass Manufacturing Company, Inc., Los Angeles, CA (US)

(72) Inventor: Curtis Patrick Odom, Vista, CA (US)

(73) Assignee: Triangle Brass Manufacturing Company, Inc., Los Angeles, CA (US)

( * ) Notice: Subject to any disclaimer, the term of this patent is extended or adjusted under 35 U.S.C. 154(b) by 0 days.

(21) Appl. No.: 16/739,259

(22) Filed: Jan. 10, 2020

(65) Prior Publication Data

US 2021/0214966 A1 Jul. 15, 2021

(51) Int. Cl.
*E05B 1/00* (2006.01)

(52) U.S. Cl.
CPC ....... *E05B 1/0015* (2013.01); *E05Y 2900/132* (2013.01)

(58) Field of Classification Search
CPC . E05B 1/0015; G09F 7/20; E04G 7/12; E05Y 2900/132
See application file for complete search history.

(56) References Cited

U.S. PATENT DOCUMENTS 1,597,856 A * 8/1926 Atkinson .................. E05C 3/14 292/238
1,652,052 A * 12/1927 Rukenbrod ........... E05B 1/0015 16/412
2,107,407 A * 2/1938 Burton ...................... E04G 7/12 403/385
2,344,376 A * 3/1944 Stone ........................ E05B 3/04 292/350
2,756,088 A * 7/1956 Sutter ................... E05B 1/0053 74/557
3,018,081 A * 1/1962 Waldbauer ............ F21V 21/116 248/230.5
3,155,353 A * 11/1964 Small ..................... A45B 11/00 248/515
3,825,358 A * 7/1974 Eisenhardt .............. F16B 2/065 403/188
3,827,739 A * 8/1974 Overholser ........... E05B 1/0053 292/347
3,848,838 A * 11/1974 Thomas ................... A47C 7/66 248/541
4,018,465 A * 4/1977 Ramler ................. E05B 1/0053 292/336.3
4,148,113 A * 4/1979 Dvorachek ............. F16L 3/223 24/16 R
D268,984 S * 5/1983 Bergen ........................... D8/308
4,397,489 A * 8/1983 Lind ..................... E05B 1/0053 16/413
4,437,654 A * 3/1984 Chiappetti .............. B25B 1/103 269/283

(Continued)

FOREIGN PATENT DOCUMENTS

EP 2657632 A2 * 10/2013 ............. F25D 23/00

*Primary Examiner* — Jason W San
(74) *Attorney, Agent, or Firm* — The Iwashko Law Firm, PLLC; Lev Ivan Gabriel Iwashko

(57) ABSTRACT

An adjustable standoff, including an attachment portion comprising an aperture into which a grip is inserted, a clamp portion disposed on a first end of the attachment portion to control movement of the grip through the aperture, and a protruding portion disposed on a second end of the attachment portion to connect to a first surface of a door.

5 Claims, 5 Drawing Sheets

(56) References Cited

U.S. PATENT DOCUMENTS

| | | | | | |
|---|---|---|---|---|---|
| 4,437,791 | A * | 3/1984 | Reynolds | E21B 17/01 | 403/386 |
| 4,442,994 | A * | 4/1984 | Logsdon | F16L 3/12 | 248/547 |
| 4,444,370 | A * | 4/1984 | Krueger | F16L 3/08 | 206/443 |
| 4,852,291 | A * | 8/1989 | Mengo | A01K 97/10 | 43/21.2 |
| 4,913,479 | A * | 4/1990 | Allison | E05B 1/0053 | 292/347 |
| 4,967,878 | A * | 11/1990 | Adams | E04G 5/16 | 182/186.8 |
| 4,971,375 | A * | 11/1990 | Grecco | E05B 1/0053 | 16/426 |
| 5,231,731 | A * | 8/1993 | Jones, Jr. | E05B 1/0053 | 16/412 |
| 5,288,116 | A * | 2/1994 | Donofrio | E05B 1/0053 | 16/DIG. 30 |
| 5,375,295 | A * | 12/1994 | Woodward | E05B 1/0053 | 16/412 |
| D361,033 | S * | 8/1995 | Van Beveren | D8/396 | |
| 5,542,776 | A * | 8/1996 | Reynolds | F16L 3/1075 | 24/115 L |
| 5,725,264 | A * | 3/1998 | Villarreal | E05B 1/0053 | 292/347 |
| 5,836,327 | A * | 11/1998 | Davis | A45B 11/00 | 135/16 |
| 6,073,920 | A * | 6/2000 | Colley | B25B 5/101 | 269/45 |
| 6,131,859 | A * | 10/2000 | Giuliano | F16L 3/1016 | 24/279 |
| 6,244,557 | B1 * | 6/2001 | Maze | A45B 11/00 | 248/214 |
| 6,254,077 | B1 * | 7/2001 | Riley, Jr. | B25B 5/10 | 269/156 |
| 6,257,537 | B1 * | 7/2001 | Williams | A01M 29/32 | 248/213.1 |
| 6,447,031 | B1 * | 9/2002 | O'Hanlon | E05B 1/0053 | 292/347 |
| 6,708,369 | B1 * | 3/2004 | Liao | E05D 5/0246 | 16/239 |
| 6,751,827 | B1 * | 6/2004 | Fok | E05B 1/0053 | 16/412 |
| 6,823,562 | B1 * | 11/2004 | Smith | B25G 1/06 | 16/421 |
| 7,284,331 | B2 * | 10/2007 | Paddock | A01D 34/828 | 30/276 |
| 7,861,982 | B1 * | 1/2011 | McClure | F16B 7/0433 | 248/74.1 |
| 8,215,731 | B2 * | 7/2012 | Drach | E05B 1/0015 | 312/405 |
| 9,777,757 | B2 * | 10/2017 | Murata | G02B 6/3624 | |
| 9,927,052 | B1 * | 3/2018 | Robillard | F16L 23/08 | |
| 9,995,074 | B2 * | 6/2018 | Hoffman | E05F 3/227 | |
| 10,765,185 | B1 * | 9/2020 | Wengerd | F16B 2/10 | |
| 10,767,676 | B2 * | 9/2020 | Cattaneo | F16B 12/46 | |
| 2002/0109355 | A1 * | 8/2002 | Elliott | F16B 2/10 | 285/410 |
| 2005/0095062 | A1 * | 5/2005 | Iverson | F16B 2/10 | 403/374.3 |
| 2007/0040075 | A1 * | 2/2007 | Moretto | F16L 3/1083 | 248/67.7 |
| 2008/0034553 | A1 * | 2/2008 | Wing | E05B 1/0015 | 16/412 |
| 2010/0322740 | A1 * | 12/2010 | Vestergaard-Jensen | F16B 12/54 | 411/321 |
| 2011/0131761 | A1 * | 6/2011 | Campbell | B60B 33/045 | 16/35 D |
| 2013/0104340 | A1 * | 5/2013 | Hasler | F16B 33/00 | 16/238 |
| 2013/0219678 | A1 * | 8/2013 | Brewster | F16B 2/065 | 24/486 |
| 2014/0007381 | A1 * | 1/2014 | Huang | A47B 95/02 | 16/421 |
| 2014/0008508 | A1 * | 1/2014 | Weber | F21V 21/0885 | 248/316.1 |
| 2014/0082898 | A1 * | 3/2014 | Maunder | F16B 37/0807 | 24/517 |
| 2014/0197628 | A1 * | 7/2014 | Giraldi | F16L 35/00 | 285/87 |
| 2014/0255086 | A1 * | 9/2014 | Wallther | E04G 7/307 | 403/205 |
| 2016/0145923 | A1 * | 5/2016 | Hoffman | E05F 3/04 | 16/71 |
| 2016/0265565 | A1 * | 9/2016 | Murata | G02B 6/3616 | |
| 2017/0284870 | A1 * | 10/2017 | Golden | F16B 2/08 | |
| 2018/0073258 | A1 * | 3/2018 | Mikic | E04G 5/046 | |
| 2019/0277055 | A1 * | 9/2019 | Rogel | B64C 1/1438 | |
| 2019/0360234 | A1 * | 11/2019 | Alkoby | E05B 1/0015 | |
| 2020/0158281 | A1 * | 5/2020 | Carnevali | A47G 29/00 | |
| 2020/0190847 | A1 * | 6/2020 | Roberts | G04F 13/02 | |
| 2021/0363779 | A1 * | 11/2021 | Bennett | E05B 1/0015 | |
| 2022/0170292 | A1 * | 6/2022 | Dulmes | E05B 1/0015 | |

* cited by examiner

ADJUSTABLE AND CONFIGURABLE STANDOFF

BACKGROUND

1. Field

The present general inventive concept relates generally to a standoff, and particularly, to an adjustable and configurable standoff.

2. Description of the Related Art

Shopping malls, office buildings, businesses, hospitals, gymnasiums, universities, schools, and other non-residential, and even residential-type edifices, often include doors that are designed to require door pulls as door-opening mechanisms. A conventional door pull may be installed either on both sides of a door, or on one side of a door with a different alternative door-opening mechanism on the other side of the door, such as a push plate, door handle, or touch bar.

The conventional door pull typically includes one, two, or three permanently fixed standoffs, which allow the door pull to be installed away from the door at a predetermined distance, thereby allowing a user to wrap a hand around the door pull and duly comply with industry standards and/or requirements of various regulations such as the Americans with Disabilities Act (ADA).

Often times, door manufacturers are different from door pull manufacturers, for at least the reason that a consumer, customer, or user may desire to purchase the door from one manufacturer, and the door pull from a different manufacturer. As such, when constructing a building, for example, the consumer typically places an order with a first manufacturer for a certain number of doors, and includes specifications for the doors to include pre-drilled holes to allow door pulls, which are ordered from a second manufacturer, to be installed on the doors.

However, due to specification imperfections, misread specifications, mis-measured drillings, and other types of human-error, the doors are often delivered to the consumer with the pre-drilled holes improperly spaced apart. As a result, the conventional door pulls cannot be installed on the door because center-to-center distances between the permanently fixed standoffs do not properly correspond to the pre-drilled holes of the doors, and therefore, either the doors or the door pulls must be reordered. Consequently, time and money are both wasted during the process of reordering properly predrilled doors or re-configured door pulls. Moreover, even if the doors are delivered with pre-drilled holes, thereby requiring the consumer to drill the holes himself/herself, the consumer must be careful to drill the holes to be spaced-apart perfectly, to allow the door pulls to be installed on the doors.

In addition, if the doors are delivered with a pre-drilled cylinder hole for installation of a door lock, then door pulls with offset standoffs may be required to allow the consumer to access the door lock. As such, if the door pulls are ordered and delivered without standoffs, then the door pulls must be reordered, thereby wasting time and money.

Therefore, there is a need for adjustable standoffs allow a consumer to easily arrange standoffs based on the consumer's preferences and/or requirements.

SUMMARY

The present general inventive concept provides an adjustable and configurable standoff.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an adjustable standoff, including an attachment portion comprising an aperture into which a grip is inserted, a clamp portion disposed on a first end of the attachment portion to control movement of the grip through the aperture, and a protruding portion disposed on a second end of the attachment portion to connect to a first surface of a door.

The clamp portion may include a clamp surface to connect to the protruding portion, and a first clamp fastener receiving aperture disposed within the clamp surface.

The protruding portion may include a set screw receiving aperture, a clamp fastener head receiving aperture, a set screw to be inserted through a second surface of the door into the set screw receiving aperture to mount the protruding portion to the door, and a clamp fastener to be inserted into the clamp fastener head receiving aperture to move the clamp portion toward the protruding portion in response to tightening the clamp fastener, and to move the clamp portion away from the protruding portion in response to extracting the clamp fastener.

The protruding portion may further include a first auxiliary set screw receiving aperture perpendicularly disposed away from the set screw receiving aperture with respect to a first direction, a second auxiliary set screw receiving aperture perpendicularly disposed away from the set screw receiving aperture with respect to a second direction, a first auxiliary set screw to be inserted into the first auxiliary set screw receiving aperture to contact at least a portion of the set screw, and a second auxiliary set screw to be inserted into the second auxiliary set screw receiving aperture to contact at least another portion of the set screw, such that the first auxiliary set screw and the second auxiliary set screw prevent the set screw from being extracted from the set screw receiving aperture.

The clamp fastener head receiving aperture may include a second clamp fastener receiving aperture to receive at least a portion of the clamp fastener through the first clamp fastener receiving aperture.

The clamp portion may reduce movement of the grip in response to moving toward the protruding portion, such that the aperture may contract in size.

The clamp portion may increase movement of the grip in response to moving away from the protruding portion, such that the aperture may expand in size.

The foregoing and/or other features and utilities of the present general inventive concept may also be achieved by providing an adjustable standoff, including an attachment portion comprising an aperture into which a grip is inserted, a clamp portion disposed on a first end of the attachment portion to control movement of the grip through the aperture, an offset portion disposed on a second end of the attachment portion to extend away from the attachment portion in a first direction, and a protruding portion to extend away from the offset portion in a second direction different from the first direction to connect to a first surface of a door.

The clamp portion may include a clamp surface to connect to the offset portion, a clamp fastener head receiving aperture disposed within the clamp surface, and a clamp fastener to be inserted into the clamp fastener head receiving aperture to move the clamp portion toward the protruding portion in response to tightening the clamp fastener, and to move the clamp portion away from the protruding portion in response to extracting the clamp fastener.

The clamp fastener head receiving aperture may include a first clamp fastener receiving aperture disposed within the clamp surface.

The offset portion may include a second clamp fastener receiving aperture to receive at least a portion of the clamp fastener through the first clamp fastener receiving aperture.

The protruding portion may include a set screw receiving aperture, and a set screw to be inserted through a second surface of the door into the set screw receiving aperture to mount the protruding portion to the door.

The clamp portion may reduce movement of the grip in response to moving toward the protruding portion, such that the aperture may contract in size.

The clamp portion may increase movement of the grip in response to moving away from the protruding portion, such that the aperture may expand in size.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
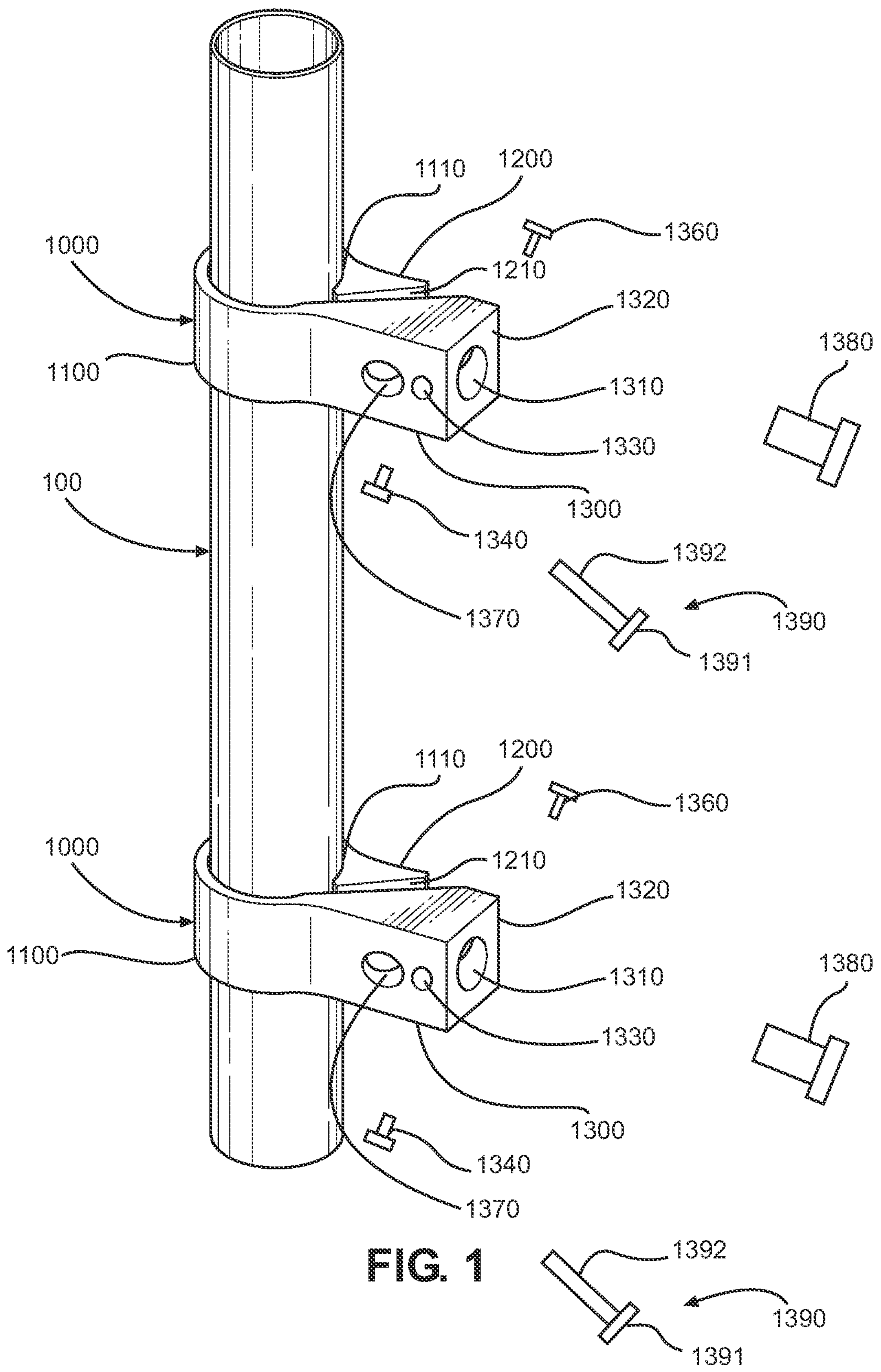
FIG. 1 illustrates an isometric rear view of an adjustable standoff, such that a grip is disposed therein, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Adjustable Standoff 1000
Attachment Portion 1100
Aperture 1110
Clamp Portion 1200
Clamp Surface 1210
First Clamp Fastener Receiving Aperture 1220
Leg 1300
Set Screw Receiving Aperture 1310
Attachment Surface 1320
First Auxiliary Set Screw Receiving Aperture 1330
First Auxiliary Set Screw 1340
Second Auxiliary Set Screw Receiving Aperture 1350
Second Auxiliary Set Screw 1360
Clamp Fastener Head Receiving Aperture 1370
Second Clamp Fastener Receiving Aperture 1371
Set Screw 1380
Clamp Fastener 1390
Fastener Head 1391
Fastener Body 1392
Adjustable Standoff 2000

Attachment Portion 2100
Aperture 2110
Clamp Portion 2200
Clamp Surface 2210
Clamp Fastener Head Receiving Aperture 2220
First Clamp Fastener Receiving Aperture 2221
Clamp Fastener 2230
Fastener Head 2231
Fastener Body 2232
Offset Portion 2300
Second Clamp Fastener Receiving Aperture 2310
Leg 2400
Set Screw Receiving Aperture 2410
Attachment Surface 2420
Set Screw 2430

FIG. 1 illustrates an isometric rear view of an adjustable standoff 1000, such that a grip 100 is disposed therein, according to an exemplary embodiment of the present general inventive concept.

The adjustable standoff 1000 may be constructed from at least one of metal, plastic, wood, and rubber, etc., but is not limited thereto.

Figure 2A:
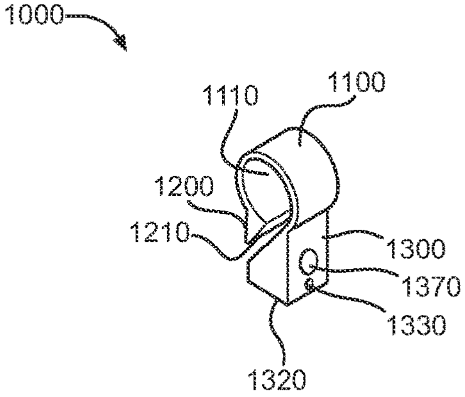
FIG. 2A illustrates an isometric rear view of the adjustable standoff, according to an exemplary embodiment of the present general inventive concept.

FIG. 2A illustrates an isometric rear view of the adjustable standoff 1000, according to an exemplary embodiment of the present general inventive concept.

Figure 2B:
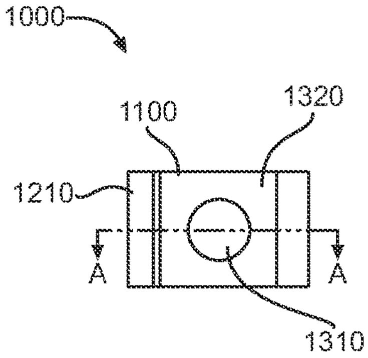
FIG. 2B illustrates a bottom view of the adjustable standoff, according to an exemplary embodiment of the present general inventive concept.

FIG. 2B illustrates a bottom view of the adjustable standoff 1000, according to an exemplary embodiment of the present general inventive concept.

Figure 2C:
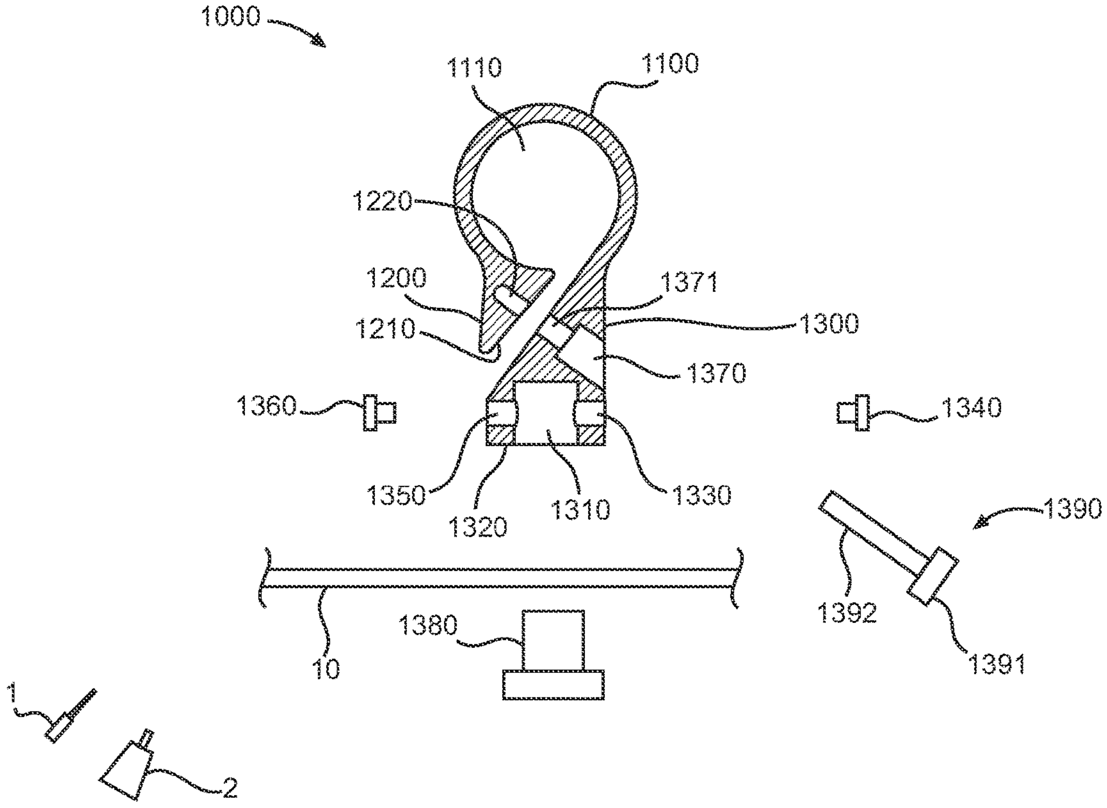
FIG. 2C illustrates a sectional view taken along A-A of FIG. 2B of the adjustable standoff, according to an exemplary embodiment of the present general inventive concept.

FIG. 2C illustrates a sectional view taken along A-A of FIG. 2B of the adjustable standoff 1000, according to an exemplary embodiment of the present general inventive concept.

Referring to FIGS. 2A through 2C, the adjustable standoff 1000 may include an attachment portion 1100, a clamp portion 1200, and a leg 1300, but is not limited thereto.

Referring to FIG. 1, the attachment portion 1100 may include an aperture 1110, which may be designed to correspond to a shape of the grip 100, such that the grip 100 may slide into and be disposed within at least one aperture 1110.

The clamp portion 1200 may include a clamp surface 1210 and a first clamp fastener receiving aperture 1220, but is not limited thereto.

The clamp portion 1200 may be disposed on a first end of the attachment portion 1100. The leg 1300 may be disposed on a second end of the attachment portion 1100.

The leg 1300 (a.k.a., a protruding portion 1300) may include a set screw receiving aperture 1310, an attachment surface 1320, a first auxiliary set screw receiving aperture 1330, a first auxiliary set screw 1340, a second auxiliary set screw receiving aperture 1350, a second auxiliary set screw 1360, a clamp fastener head receiving aperture 1370, a set screw 1380, and a clamp fastener 1390, but is not limited thereto.

The first auxiliary set screw 1340 may include a twine, a string, a rope, a magnet, a clasp, a hook, a screw, a nail, a bolt, a nut, a washer, and/or any combination thereof, but is not limited thereto.

The second auxiliary set screw 1360 may include a twine, a string, a rope, a magnet, a clasp, a hook, a screw, a nail, a bolt, a nut, a washer, and/or any combination thereof, but is not limited thereto.

The set screw 1380 may include a twine, a string, a rope, a magnet, a clasp, a hook, a screw, a nail, a bolt, a nut, a washer, and/or any combination thereof, but is not limited thereto.

The clamp fastener 1390 may include a twine, a string, a rope, a magnet, a clasp, a hook, a screw, a nail, a bolt, a nut, a washer, and/or any combination thereof, but is not limited thereto.

The set screw receiving aperture 1310 may be disposed on at least a portion of the attachment surface 1320. The attachment surface 1320 may be disposed on a first surface of a door 10. Additionally, the set screw 1380 may be inserted into the set screw receiving aperture 1310 through a second surface of the door 10, opposite with respect to the first surface, such that the adjustable standoff 1000 may be mounted on the first surface of the door 10. Also, the set screw 1380 may be rotated to be tightened within the set screw receiving aperture 1310 in a first direction and extracted from the set screw receiving aperture 1310 in a second direction, using a tool 1, such as a screwdriver or a wrench. Also, an adhesive 2 may be applied to the set screw 1380 prior to insertion within the set screw receiving aperture 1310 to prevent the set screw 1380 from being extracted from the set screw receiving aperture 1310.

The first auxiliary set screw receiving aperture 1330 may be perpendicularly disposed away from the set screw receiving aperture 1310 with respect to a first direction on at least a portion of a first side of the leg 1300. The second auxiliary set screw receiving aperture 1350 may be perpendicularly disposed away from the set screw receiving aperture 1310 with respect to a second direction on at least a portion of a second side of the leg 1300, opposite with respect to the first side of the leg 1300. The first auxiliary set screw receiving aperture 1330 may receive the first auxiliary set screw 1340, and the second auxiliary set screw receiving aperture 1350 may receive the second auxiliary set screw 1360. The first auxiliary set screw 1340 and/or the second auxiliary set screw 1360 may contact at least a portion of the set screw 1380. As such, the first auxiliary set screw 1340 and/or the second auxiliary set screw 1360 may prevent the set screw 1380 from being extracted from the set screw receiving aperture 1310.

The clamp surface 1210 may be moved away from the leg 1300, such that the aperture 1110 may be expanded to facilitate insertion of the grip 100 therein. In other words, the attachment portion 1110 may deform in response to movement of the clamp surface 1210 away from the leg 1300, such that the aperture 1110 may increase in size.

As such, the clamp portion 1200 may control movement of the grip 100 therethrough. The clamp portion 1200 reduces movement of the grip 100 in response to moving toward the leg 1300, and increases movement of the grip 100 in response to moving away from the leg 1300.

The clamp fastener head receiving aperture 1370 may include a second clamp fastener receiving aperture 1371, but is not limited thereto.

The clamp fastener 1390 may include a fastener head 1391 and a fastener body 1392, but is not limited thereto.

Furthermore, the clamp surface 1210 may contact at least a portion of the leg 1300. The clamp fastener head receiving aperture 1370 may be disposed on at least a portion of the first side of the leg 1300. Moreover, the clamp fastener 1390 may be inserted into the clamp fastener head receiving aperture 1370. More specifically, at least a portion of the fastener body 1392 may be inserted into the first clamp fastener receiving aperture 1220 and at least a portion of the second clamp fastener receiving aperture 1371. Also, the clamp fastener head receiving aperture 1370 may receive the fastener head 1391 therein.

As such, the clamp fastener 1390 may be rotated to be tightened within the first clamp fastener receiving aperture

1220 and the second clamp fastener receiving aperture 1371 in a first direction, and extracted from the first clamp fastener receiving aperture 1220 and the second clamp fastener receiving aperture 1371 in a second direction, using the tool 1. As such, the clamp portion 1200 may move toward the leg 1300 in response to tightening the clamp fastener 1390, and move away from the leg 1300 in response to extracting the clamp fastener 1390.

Therefore, the adjustable standoff 1000 may provide flexibility to connect the grip 100 to the door 10. Furthermore, the adjustable standoff 1000 may accommodate various shapes and/or sizes of the grip 100 due to variability in the size of the aperture 1110.

Figure 3:
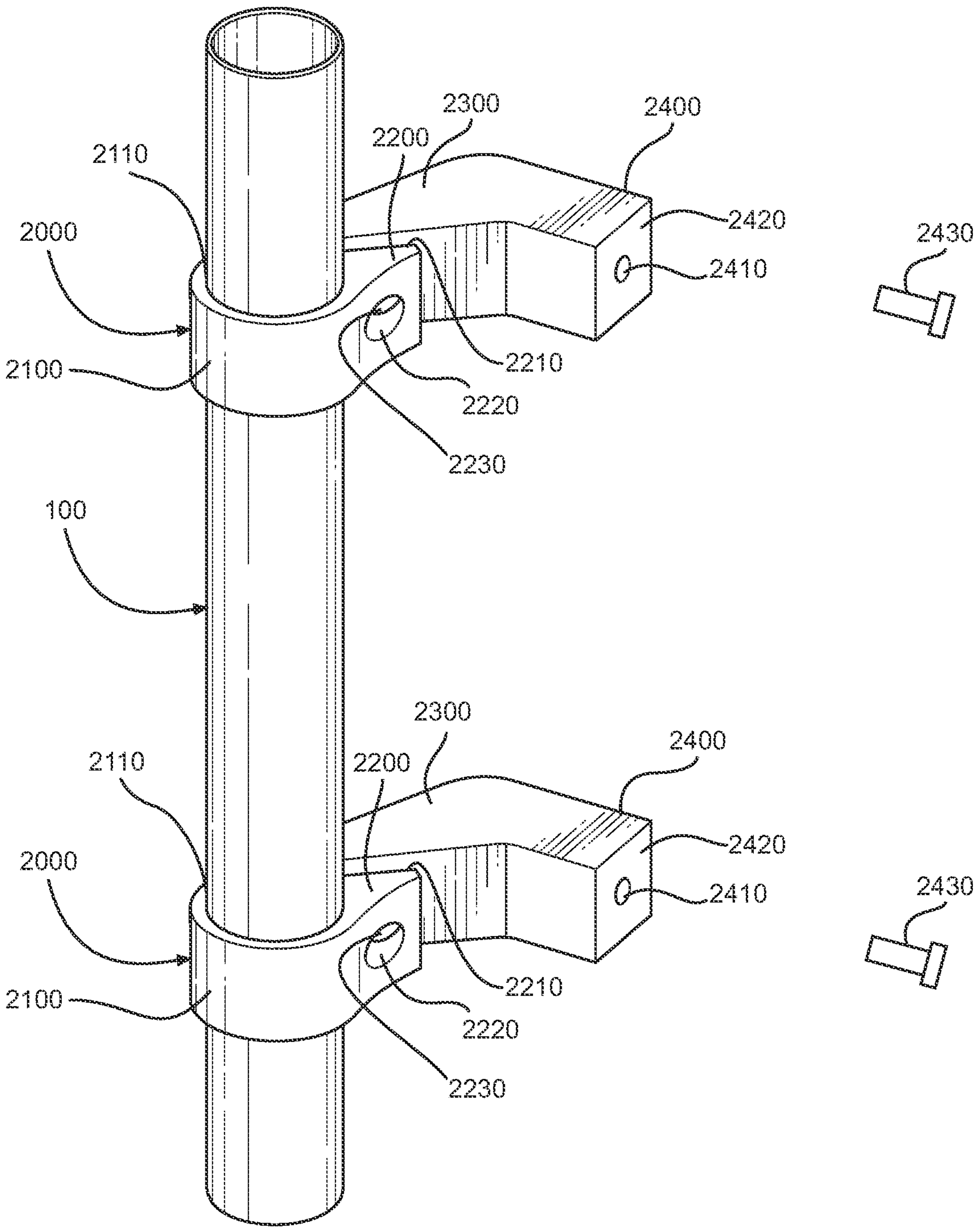
FIG. 3 illustrates an isometric rear view of an adjustable standoff, such that a grip is disposed therein, according to another exemplary embodiment of the present general inventive concept.

FIG. 3 illustrates an isometric rear view of an adjustable standoff 2000, such that a grip 100 is disposed therein, according to another exemplary embodiment of the present general inventive concept.

The adjustable standoff 2000 may be constructed from at least one of metal, plastic, wood, and rubber, etc., but is not limited thereto.

Figure 4:
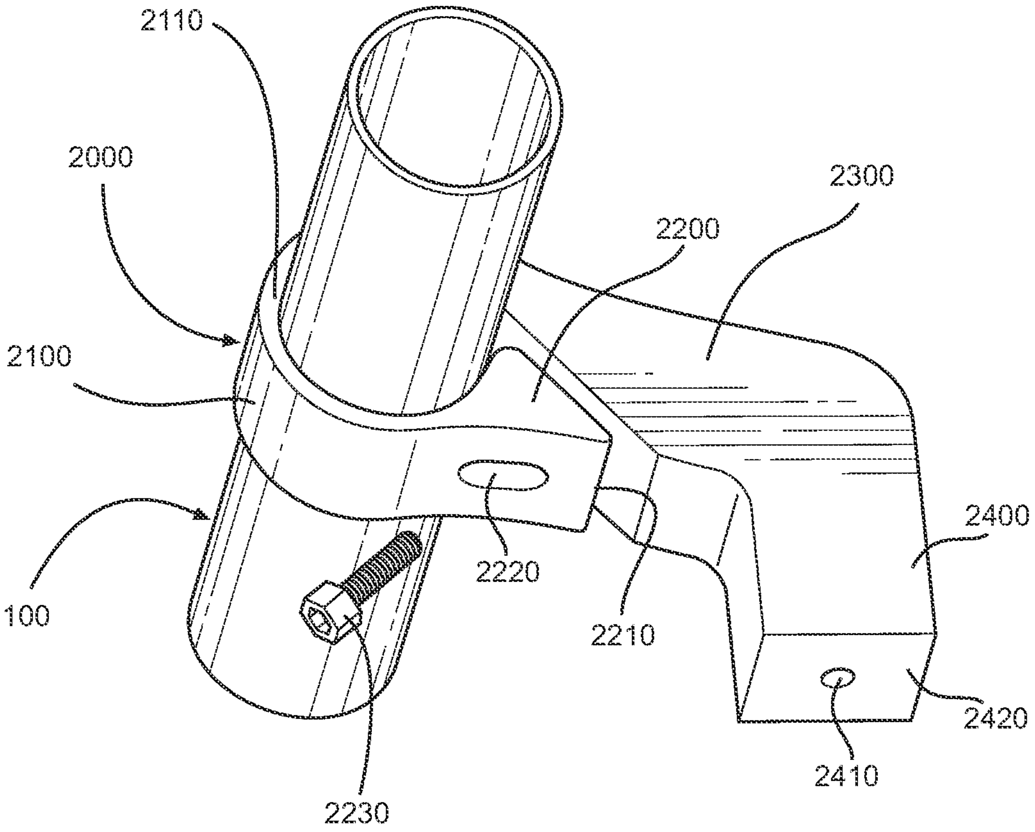
FIG. 4 illustrates an isometric rear view of an adjustable standoff, such that a grip is disposed therein, according to another exemplary embodiment of the present general inventive concept.

FIG. 4 illustrates an isometric rear view of the adjustable standoff 2000, such that a grip is disposed therein, according to another exemplary embodiment of the present general inventive concept.

Figure 5A:
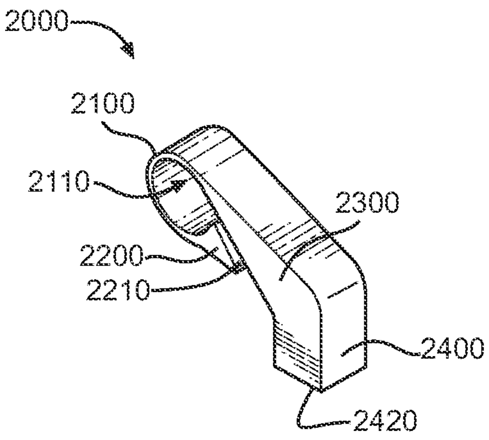
FIG. 5A illustrates a top perspective view of the adjustable standoff, according to another exemplary embodiment of the present general inventive concept.

FIG. 5A illustrates a top perspective view of the adjustable standoff 2000, according to another exemplary embodiment of the present general inventive concept.

Figure 5B:
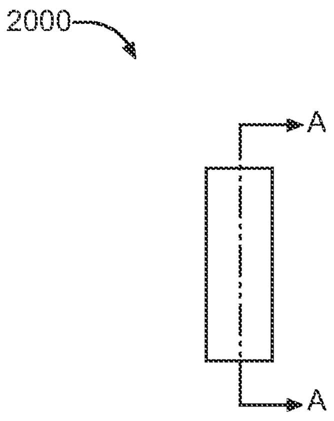
FIG. 5B illustrates a top view of the adjustable standoff, according to another exemplary embodiment of the present general inventive concept.

FIG. 5B illustrates a top view of the adjustable standoff 2000, according to another exemplary embodiment of the present general inventive concept.

Figure 5C:
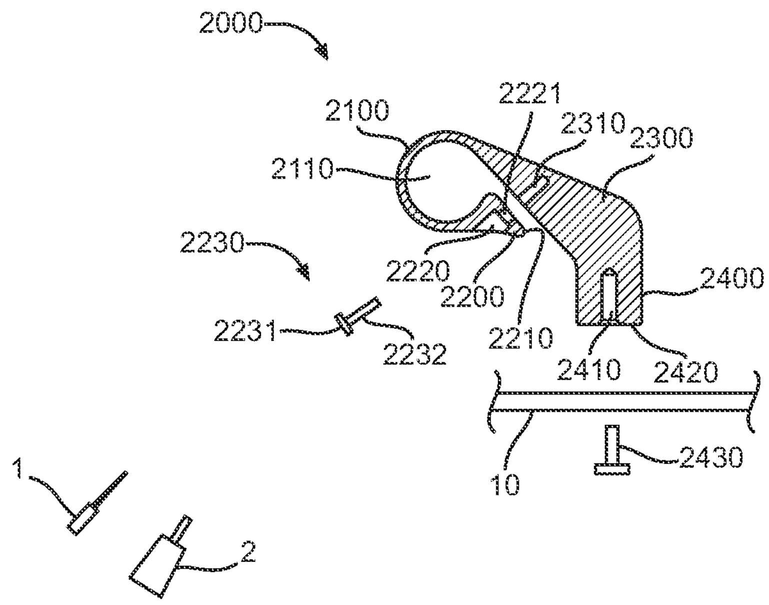
FIG. 5C illustrates a sectional view taken along A-A of FIG. 5B of the adjustable standoff, according to another exemplary embodiment of the present general inventive concept.

FIG. 5C illustrates a sectional view taken along A-A of FIG. 5B of the adjustable standoff 2000, according to another exemplary embodiment of the present general inventive concept.

Referring to FIGS. 5A through 5C, the adjustable standoff 2000 may include an attachment portion 2100, a clamp portion 2200, an offset portion 2300, and a leg 2400, but is not limited thereto.

The attachment portion 2100 may include an aperture 2110, which may be designed to correspond to a shape of the grip 100, such that the grip 100 may slide into and be disposed within at least one aperture 2110.

The clamp portion 2200 may include a clamp surface 2210, a clamp fastener head receiving aperture 2220, and a clamp fastener 2230, but is not limited thereto.

The clamp portion 2200 may be disposed on a first end of the attachment portion 2100. The offset portion 2300 may be disposed on a second end of the attachment portion 2100. In other words, the attachment portion 2100 may be disposed on a first end of the offset portion 2300.

The clamp fastener head receiving aperture 2220 may include a first clamp fastener receiving aperture 2221, but is not limited thereto.

The clamp fastener 2230 may include a twine, a string, a rope, a magnet, a clasp, a hook, a screw, a nail, a bolt, a nut, a washer, and/or any combination thereof, but is not limited thereto.

The offset portion 2300 may include a second clamp fastener receiving aperture 2310, but is not limited thereto.

The clamp surface 2210 may be moved away from the offset portion 2300, such that the aperture 2110 may be expanded to facilitate insertion of the grip 100 therein. In other words, the attachment portion 2110 may deform in response to movement of the clamp surface 2210 away from the offset portion 2300, such that the aperture 2110 may increase in size.

As such, the clamp portion 2200 may control movement of the grip 100 therethrough. The clamp portion 2200 reduces movement of the grip 100 in response to moving toward the offset portion 2300, and increases movement of the grip 100 in response to moving away from the offset portion 2300.

Referring to FIG. 5C, the clamp fastener 2230 may include a fastener head 2231 and a fastener body 2232, but is not limited thereto.

Furthermore, the clamp surface 2210 may contact at least a portion of the offset portion 2300. The second clamp fastener head receiving aperture 2310 may be disposed on at least a portion of the offset portion 2300. Moreover, the clamp fastener 2230 may be inserted into the clamp fastener head receiving aperture 2220. More specifically, at least a portion of the fastener body 2232 may be inserted into the first clamp fastener receiving aperture 2221 and at least a portion of the second clamp fastener receiving aperture 2310. Also, the clamp fastener head receiving aperture 2310 may receive the fastener head 2231 therein.

As such, the clamp fastener 2230 may be rotated to be tightened within the first clamp fastener receiving aperture 2221 and the second clamp fastener receiving aperture 2310 in a first direction, and extracted from the first clamp fastener receiving aperture 2221 and the second clamp fastener receiving aperture 2310 in a second direction, using the tool 1. As such, the clamp portion 2200 may move toward the offset portion 2300 in response to tightening the clamp fastener 2230, and move away from the offset portion 2300 in response to extracting the clamp fastener 2230.

As illustrated in FIGS. 3 and 4, the leg 2400 (a.k.a., a protruding portion 2400) may be offset from the grip 100 by the offset portion 2300. Specifically, the offset portion 2300 may extend away from the attachment portion 2100 and/or the grip 100 a predetermined distance away from the leg 2400 and/or the door 10 in a first direction.

The leg 2400 may include a set screw receiving aperture 2410, an attachment surface 2420, and a set screw 2430, but is not limited thereto.

The leg 2400 may be disposed on a second end of the offset portion 2300. The leg 2400 may extend away from the offset portion 2300 in a second direction different from the first direction.

The set screw 2430 may include a twine, a string, a rope, a magnet, a clasp, a hook, a screw, a nail, a bolt, a nut, a washer, and/or any combination thereof, but is not limited thereto.

The set screw receiving aperture 2410 may be disposed on at least a portion of the attachment surface 2420. The attachment surface 2420 may be disposed on the first surface of the door 10. Additionally, the set screw 2430 may be inserted into the set screw receiving aperture 2410 through the second surface of the door 10, such that the adjustable standoff 2000 may be mounted on the first surface of the door 10. Also, the set screw 2430 may be rotated to be tightened within the set screw receiving aperture 2410 in a first direction and extracted from the set screw receiving aperture 2410 in a second direction, using the tool 1. Also, the adhesive 2 may be applied to the set screw 2430 prior to insertion within the set screw receiving aperture 2410 to prevent the set screw 2430 from being extracted from the set screw receiving aperture 2410.

Therefore, the adjustable standoff 2000 may provide flexibility to connect the grip 100 to the door 10. Furthermore, the adjustable standoff 2000 may accommodate various shapes and/or sizes of the grip 100 due to variability in the size of the aperture 2110.

The present general inventive concept may include an adjustable standoff 1000, including an attachment portion 1100 comprising an aperture 1110 into which a grip 100 is inserted, a clamp portion 1200 disposed on a first end of the attachment portion 1100 to control movement of the grip 100 through the aperture 1110, and a protruding portion 1300 disposed on a second end of the attachment portion 1100 to connect to a first surface of a door 10.

The clamp portion 1200 may include a clamp surface 1210 to connect to the protruding portion 1300, and a first clamp fastener receiving aperture 1220 disposed within the clamp surface 1210.

The protruding portion 1300 may include a set screw receiving aperture 1310, a clamp fastener head receiving aperture 1370, a set screw 1380 to be inserted through a second surface of the door 10 into the set screw receiving aperture 1310 to mount the protruding portion 1300 to the door 10, and a clamp fastener 1390 to be inserted into the clamp fastener head receiving aperture 1370 to move the clamp portion 1200 toward the protruding portion 1300 in response to tightening the clamp fastener 1390, and to move the clamp portion 1200 away from the protruding portion 1300 in response to extracting the clamp fastener 1390.

The protruding portion 1300 may further include a first auxiliary set screw receiving aperture 1330 perpendicularly disposed away from the set screw receiving aperture 1310 with respect to a first direction, a second auxiliary set screw receiving aperture 1350 perpendicularly disposed away from the set screw receiving aperture 1310 with respect to a second direction, a first auxiliary set screw 1340 to be inserted into the first auxiliary set screw receiving aperture 1330 to contact at least a portion of the set screw 1380, and a second auxiliary set screw 1360 to be inserted into the second auxiliary set screw receiving aperture 1350 to contact at least another portion of the set screw 1380, such that the first auxiliary set screw 1340 and the second auxiliary set screw 1360 prevent the set screw 1380 from being extracted from the set screw receiving aperture 1310.

The clamp fastener head receiving aperture 1370 may include a second clamp fastener receiving aperture 1371 to receive at least a portion of the clamp fastener 1390 through the first clamp fastener receiving aperture 1220.

The clamp portion 1200 may reduce movement of the grip 100 in response to moving toward the protruding portion 1300, such that the aperture 1110 may contract in size.

The clamp portion 1200 may increase movement of the grip 100 in response to moving away from the protruding portion 1300, such that the aperture 1110 may expand in size.

The present general inventive concept may also include an adjustable standoff 2000, including an attachment portion 2100 comprising an aperture 2110 into which a grip 100 is inserted, a clamp portion 2200 disposed on a first end of the attachment portion 2100 to control movement of the grip 100 through the aperture 2110, an offset portion 2300 disposed on a second end of the attachment portion 2100 to extend away from the attachment portion 2100 in a first direction, and a protruding portion 2400 to extend away from the offset portion 2300 in a second direction different from the first direction to connect to a first surface of a door 10.

The clamp portion 2200 may include a clamp surface 2210 to connect to the offset portion 2300, a clamp fastener head receiving aperture 2220 disposed within the clamp surface 2210, and a clamp fastener 2230 to be inserted into the clamp fastener head receiving aperture 2220 to move the clamp portion 2200 toward the protruding portion 2400 in response to tightening the clamp fastener 2230, and to move the clamp portion 2200 away from the protruding portion 2400 in response to extracting the clamp fastener 2230.

The clamp fastener head receiving aperture 2220 may include a first clamp fastener receiving aperture 2221 disposed within the clamp surface 2210.

The offset portion 2300 may include a second clamp fastener receiving aperture 2310 to receive at least a portion of the clamp fastener 2230 through the first clamp fastener receiving aperture 2221.

The protruding portion 2400 may include a set screw receiving aperture 2410, and a set screw 2430 to be inserted through a second surface of the door 10 into the set screw receiving aperture 2410 to mount the protruding portion 2400 to the door 10.

The clamp portion 2200 may reduce movement of the grip 100 in response to moving toward the protruding portion 2400, such that the aperture 2110 may contract in size.

The clamp portion 2200 may increase movement of the grip 100 in response to moving away from the protruding portion 2400, such that the aperture 2110 may expand in size.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An adjustable standoff to be mounted to a door, the adjustable standoff comprising: an attachment portion comprising an aperture into which a grip is inserted, such that a diameter of the aperture within the attachment portion is the same throughout an entirety of an interior of the attachment portion with respect to a perpendicular direction of the aperture;

a clamp fastener, comprising:

a fastener body having an elongated shape, and a fastener head having a circumference larger than the fastener body;

a clamp portion disposed at a first end of the attachment portion to control movement of the grip through the aperture, the clamp portion comprising:

a clamp surface, and a first clamp fastener receiving aperture disposed within the clamp surface and at least a portion of the clamp portion to receive a first portion of the fastener body therein; and a protruding portion having a first end disposed at a second end of the attachment portion and having a second end to connect to a first surface of the door, such that the protruding portion is detachably connectable to the clamp portion, the protruding portion comprising:

a planar surface to face the clamp surface such that the planar surface is connectable to the clamp surface, a second clamp fastener receiving aperture disposed within the planar surface and at least a portion of the protruding portion to receive a second portion of the fastener body therein, and a clamp fastener head receiving aperture connected to the second clamp fastener receiving aperture and extending to an outer surface of the protruding portion to receive the fastener head therein, such that the clamp fastener enters the clamp fastener head receiving aperture at a non-orthogonal angle with respect to the outer surface of the protruding portion and enters the first clamp fastener receiving aperture at an orthogonal angle with respect to the clamp surface, wherein the clamp fastener head receiving aperture has a circumference that is larger than a circumference of the second clamp fastener receiving aperture, and wherein, when the clamp surface is connected to the planar surface via the clamp fastener by the clamp fastener, the first portion of the fastener body is disposed within the first clamp fastener receiving aperture, the second portion of the fastener body is disposed within the second clamp fastener receiving aperture, and the fastener head is disposed within the clamp fastener head receiving aperture.

2. The adjustable standoff of claim 1, wherein the protruding portion comprises:

a set screw receiving aperture; and a set screw to be inserted through a second surface of the door into the set screw receiving aperture to mount the protruding portion to the door.

3. The adjustable standoff of claim 2, wherein the protruding portion further comprises:

a first auxiliary set screw receiving aperture perpendicularly disposed away from the set screw receiving aperture with respect to a first direction;

a second auxiliary set screw receiving aperture perpendicularly disposed away from the set screw receiving aperture with respect to a second direction;

a first auxiliary set screw to be inserted into the first auxiliary set screw receiving aperture to contact at least a portion of the set screw; and a second auxiliary set screw to be inserted into the second auxiliary set screw receiving aperture to contact at least another portion of the set screw, such that the first auxiliary set screw and the second auxiliary set screw prevent the set screw from being extracted from the set screw receiving aperture.

4. The adjustable standoff of claim 1, wherein the clamp portion reduces movement of the grip in response to moving toward the protruding portion, such that the aperture contracts in size.

5. The adjustable standoff of claim 1, wherein the clamp portion increases movement of the grip in response to moving away from the protruding portion, such that the aperture expands in size.

* * * * *